(12) United States Patent
Migliavacca

(10) Patent No.: US 8,416,549 B2
(45) Date of Patent: Apr. 9, 2013

(54) METHOD FOR PROVIDING OVER-VOLTAGE PROTECTION AND CIRCUIT THEREFOR

(75) Inventor: Paolo Migliavacca, Mauzac (FR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 12/863,412

(22) PCT Filed: Mar. 13, 2008

(86) PCT No.: PCT/US2008/056862
§ 371 (c)(1),
(2), (4) Date: Jul. 16, 2010

(87) PCT Pub. No.: WO2009/114016
PCT Pub. Date: Sep. 17, 2009

(65) Prior Publication Data
US 2011/0051303 A1 Mar. 3, 2011

(51) Int. Cl.
*H02H 9/04* (2006.01)
(52) U.S. Cl.
USPC .......................... 361/91.1; 361/91.5
(58) Field of Classification Search .............. 361/56, 361/82
See application file for complete search history.

(56) References Cited

U.S. PATENT DOCUMENTS

| 3,809,999 | A * | 5/1974 | Smith | 323/285 |
| 7,495,416 | B2 * | 2/2009 | Sato et al. | 320/134 |
| 2005/0134228 | A1 * | 6/2005 | Elder | 320/134 |
| 2005/0153574 | A1 * | 7/2005 | Mandal | 438/790 |
| 2005/0156574 | A1 | 7/2005 | Sato et al. | |
| 2005/0242779 | A1 | 11/2005 | Yoshio | |
| 2006/0208850 | A1 * | 9/2006 | Ikeuchi et al. | 340/5.8 |
| 2006/0267110 | A1 * | 11/2006 | Chen | 257/401 |
| 2007/0064362 | A1 * | 3/2007 | Migliavacca | 361/82 |
| 2009/0167249 | A1 | 7/2009 | Wang et al. | |
| 2009/0251104 | A1 * | 10/2009 | Yamamoto et al. | 320/134 |
| 2010/0007999 | A1 * | 1/2010 | Iwata | 361/18 |

FOREIGN PATENT DOCUMENTS

GB 2421644 * 6/2006

* cited by examiner

*Primary Examiner* — Stephen W Jackson
*Assistant Examiner* — Angela Brooks
(74) *Attorney, Agent, or Firm* — Rennie William Dover

(57) ABSTRACT

A bi-directional over-voltage protection circuit and a method for blocking current flow therein. The bi-directional over-voltage protection circuit comprises a regulator coupled to a lockout circuit, wherein the regulator and the lockout circuit are coupled for receiving an input signal and are coupled to a charging control circuit. A reverse path control circuit has an input coupled for receiving a control signal and an output coupled to the charging control circuit. A multi-transistor switching circuit is coupled to the forward control circuit. Preferably, the gate of each n-channel MOSFET is coupled to the charging control circuit, the drains are coupled together, and the source of one of the n-channel MOSFETS is coupled to an input and the source of the other n-channel MOSFET is coupled to an output of the bi-directional over-voltage protection circuit.

20 Claims, 4 Drawing Sheets

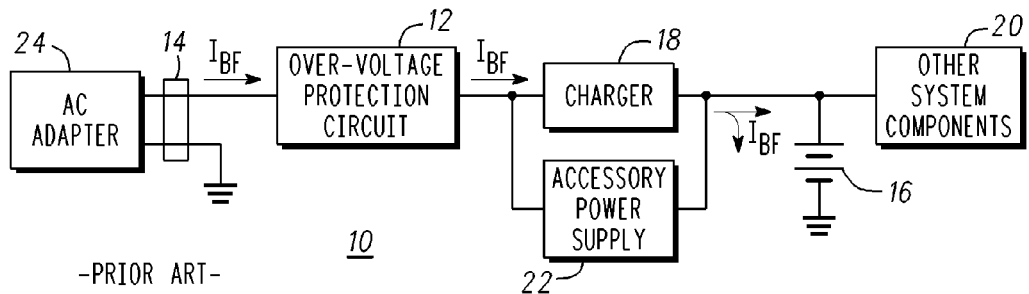
FIG. 1 -PRIOR ART-
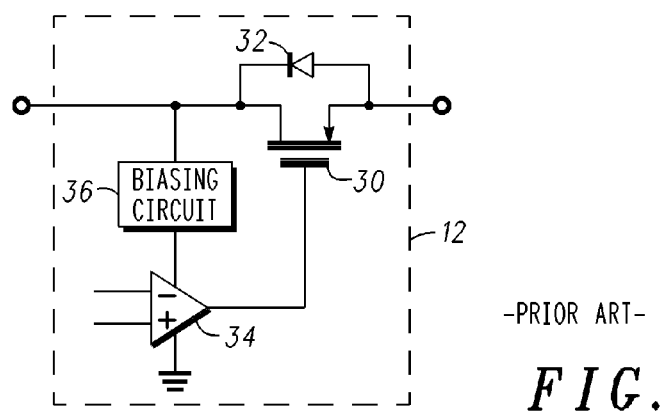
FIG. 2 -PRIOR ART-
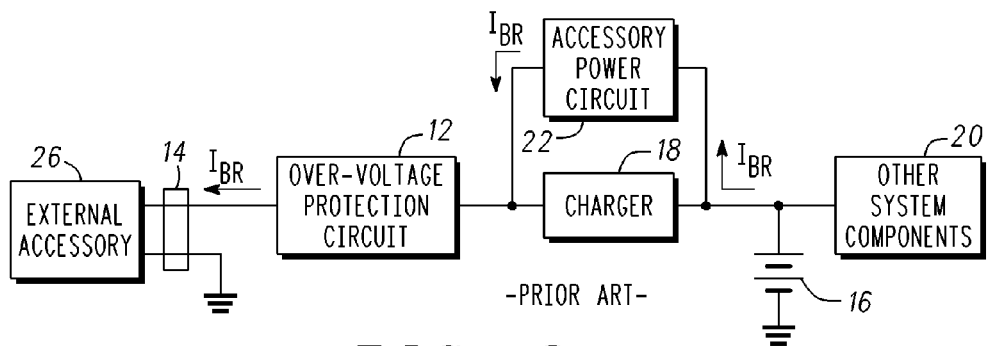
FIG. 3 -PRIOR ART-

METHOD FOR PROVIDING OVER-VOLTAGE PROTECTION AND CIRCUIT THEREFOR

TECHNICAL FIELD

The present invention relates, in general, to semiconductor components and, more particularly, to over-voltage protection circuits.

BACKGROUND

In the past, the semiconductor industry used various methods and structures to form power management circuits in applications that included charging a battery that is internal to an electronic product such as a cellular phone and supplying power to an external accessory such as a headset. In most cases, the power management circuits included an over-voltage protection circuit that protected systems connected to power sources as well as loads coupled to the systems from over-voltage conditions. One example of a power management circuit is an over-voltage protection circuit having part number bq24316 manufactured by Texas Instruments Incorporated of Dallas, Tex. FIG. 1 illustrates a cell phone 10 having a prior art over-voltage protection circuit 12 such as a bq24316 and having an input connected to a connector 14 and an output coupled to a power source 16 through a charger 18. Typically power source 16 is a battery pack. The outputs of charger 18 and power source 16 are connected to other system components 20. An accessory power supply 22 is coupled in parallel with charger 18. In one configuration cell phone 10 is coupled to an alternating current (AC) adapter 24 that provides a current $I_{BF}$ to cell phone 10. In this configuration, charger 18 is enabled, accessory power supply 22 is disabled, and current $I_{BF}$ flows from AC adapter 24 through connector 14 and over-voltage protection circuit 12 to charge power source 16 and to provide power to system components 20. FIG. 2 illustrates a block diagram of over-voltage protection circuit 12. What is shown in FIG. 2 is a field effect transistor 30 coupled between the input and output of over-voltage protection circuit 12. Field effect transistor 30 has a body diode 32. In addition, FIG. 2 illustrates gate drive circuit 34 coupled to the gate of field effect transistor 30 and a biasing circuit 36 coupled between one of the current carrying electrodes of field effect transistor 30 and gate drive circuit 34. FIG. 3 illustrates an alternative prior art configuration in which AC adapter 24 is replaced by an external accessory 26 such as a headset. In this configuration, charger 18 is disabled and accessory power supply 22 is enabled. A current $I_{BR}$ flows from power source 16 through accessory power supply 22 and over-voltage protection circuit 12 to drive external accessory 26.

In operation, when the voltage at connector 14, e.g., the output voltage of a wall adapter, is high, body diode 32 is reverse biased. In addition, if the output voltage of the wall adapter is inside the under-voltage lockout/over-voltage lockout (UVLO/OVLO) window determined by a lockout circuit, gate drive circuit 34 biases the gate of field effect transistor 30 such that current flows between the input and the output of over-voltage protection circuit 12. However, if the wall adapter is removed and the output voltage of over-voltage protection circuit 12 is high, as for example when the battery supplies an accessory, then body diode 32 is forward biased and the input of over-voltage protection circuit 12 presents a voltage equal to $V_{OUT}-0.7$ volts. In normal operation, gate drive circuit 34 biases the gate of field effect transistor 30 to conduct current only when a voltage equal to $V_{OUT}-0.7$ volts is greater than an under-voltage lockout reference level. Under this condition, reverse current $I_{BR}$ fully flows through over-voltage protection circuit 12. Accessory power supply 22 is included to shunt the current away from charger 18 to increase the voltage available to the over-voltage output from the battery in the event that a reverse mode is activated. Thus, accessory power supply 22 serves as a step-up direct current-direct current (DC-DC) converter.

Accordingly, it would be advantageous to have an over-voltage protection circuit and a method for protecting a system or an accessory device that does not place limitations on the power source for supplying a voltage to an accessory power supply. It would be of further advantage for the circuit and method to be time and cost efficient to implement.

BRIEF DESCRIPTION OF THE DRAWINGS

The present invention will be better understood from a reading of the following detailed description, taken in conjunction with the accompanying drawing figures, in which like reference characters designate like elements and in which:

FIG. 1 is a block diagram of a prior art over-voltage protection circuit during a charging operation;

FIG. 2 is a circuit diagram of a prior art over-voltage protection circuit;

FIG. 3 a block diagram of the prior art over-voltage protection circuit of FIG. 1 during an accessory powering operation;

DETAILED DESCRIPTION

Figure 4:
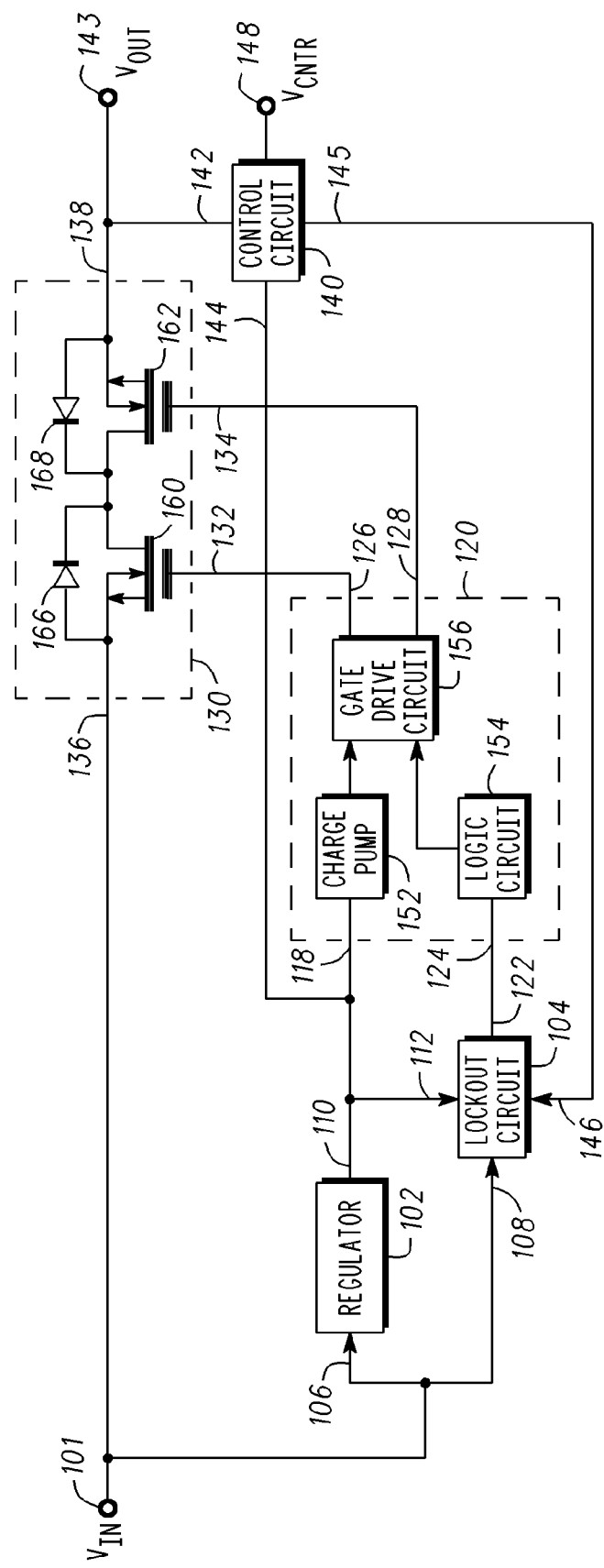
FIG. 4 is a block diagram of an over-voltage protection circuit in accordance with an embodiment of the present invention.

Generally, the present invention provides a method and a structure for blocking current flow in an over-voltage protection circuit. In accordance with one embodiment of the present invention, an input signal is provided at an input node and a charging current is generated that flows from the input node to an output node in response to a charging control signal and the input signal. The current path of the charging current is blocked and an accessory drive current is generated that flows through the output node in response to an accessory drive control signal. The accessory drive current flows from the output node to the input node. Thus, the accessory drive control signal stops or blocks current flow from an output to an input and controls current consumption by the over-voltage protection circuit.

In accordance with another embodiment of the present invention, a bi-directional over-voltage protection circuit comprises a voltage regulator coupled to a lockout circuit, wherein the regulator and the lockout circuit are coupled for receiving an input signal. The voltage regulator and the lockout circuit are coupled to a charging control circuit. The charging control circuit is also referred to as a forward path control circuit. An accessory drive circuit has an input coupled for receiving a control signal and an output coupled to the charging control circuit. The accessory drive circuit is also referred to as reverse path control circuit. A multi-transistor switching circuit is coupled to the charging control circuit, wherein the multi-transistor switching circuit may comprise a pair of integrated power n-channel MOSFETS (n-channel metal oxide semiconductor field effect transistors). Preferably, the gate of each n-channel MOSFET is coupled to the charging control circuit, the drains are coupled together, and the source of one of the n-channel MOSFETS is coupled to an input and the source of the other n-channel MOSFET is coupled to an output of the bi-directional over-voltage protection circuit.

In accordance with another embodiment of the present invention, a bi-directional over-voltage protection circuit comprises a forward multi-transistor switching control circuit capable of regulating an input voltage, a reverse multi-transistor switching control circuit, and a multi-transistor switching circuit. The forward multi-transistor switching control circuit has a plurality of inputs and a plurality of outputs, wherein an input is coupled for receiving the input voltage and the reverse multi-transistor switching control circuit has a plurality of inputs and an output, wherein the output is coupled to the forward multi-transistor switching control circuit. A multi-transistor switching circuit having a plurality of inputs and a plurality of current carrying electrodes is coupled to the forward multi-transistor switching control circuit. The inputs of the multi-transistor switching circuit are coupled to corresponding outputs of the forward multi-transistor switching control circuit and a current carrying electrode of the multi-transistor switching circuit is coupled for receiving the input voltage.

In accordance with another embodiment of the present invention, a bi-directional over-voltage protection circuit comprises forward and reverse signal paths. The forward signal path has an input and an output in which a charging signal travels from the input to the output in response to a charge control signal. The reverse signal path has an input and an output in which an accessory drive signal travels in a reverse direction in response to an accessory drive control signal. The reverse direction is different from the forward direction. The bi-directional over-voltage protection circuit further comprises a control circuit that generates the charging and accessory drive control signals.

FIG. 4 is a block diagram of an over-voltage protection circuit 100 in accordance with an embodiment of the present invention. What is shown in FIG. 4 is a voltage regulator 102 and a lockout circuit 104 having inputs 106 and 108, respectively, commonly coupled to each other and for receiving an input voltage $V_{IN}$ at input 101. Input 101 is also referred to as an input node. An output 110 of voltage regulator 102 is connected to an input 112 of lockout circuit 104 and to an input 118 of a control circuit 120. An output 122 of lockout circuit 104 is connected to an input 124 of control circuit 120. Control circuit 120 has outputs 126 and 128 connected to inputs 132 and 134, respectively, of a switching circuit 130 and is referred to as a forward multi-transistor switching control circuit. A conductor 136 of switching circuit 130 is commonly connected to inputs 106 and 108 of voltage regulator 102 and lockout circuit 104, respectively, and a conductor 138 of switching circuit 130 is connected to an input 142 of a control circuit 140. An output signal $V_{OUT}$ appears at an output node 143. Control circuit 140 is also referred to as a reverse multi-transistor switching control circuit and output 143 is also referred to as an output node. In addition, control circuit 140 has an input 148 coupled for receiving a control signal ($V_{CNTR}$) from, for example, a central processing unit of a cellular telephone, an output 144 connected to output 110 of voltage regulator 102, and an output 145 coupled to an input 146 of lockout circuit 104. When over-voltage protection circuit 100 operates in a reverse direction, control circuit 140 supplies a control signal via output 144 to an input of control circuit 120 and it supplies a control signal via output 145 to input 146 that removes the under-voltage lockout (UVLO).

By way of example, control circuit 120 comprises a charge pump 152 coupled to a gate drive circuit 156 and a logic circuit 154 coupled to gate drive circuit 156. The input of charge pump 152 serves as input 118 of control circuit 120, the input of logic circuit 154 serves as input 124 of control circuit 120, and the outputs of gate drive circuit 156 serve as outputs 126 and 128, respectively, of control circuit 120. Switching circuit 130 is comprised of power field effect transistors 160 and 162, wherein each transistor has source and drain electrodes and a gate electrode when power field effect transistors 160 and 162 are power MOSFETS. More particularly, the source and gate electrodes of power field effect transistor 160 serve as conductor 136 and input 132 of switching circuit 130, respectively, and the source and gate electrodes of power field effect transistor 162 serve as conductor 138 and input 134 of switching circuit 130, respectively. It should be noted that the source and drain electrodes of a transistor are also referred to as current carrying electrodes and the gate electrode of a transistor is also referred to as a control electrode. A body diode 166 is formed from the source to the drain of transistor 160 and a body diode 168 is formed from the source to the drain of transistor 162.

Figure 5:
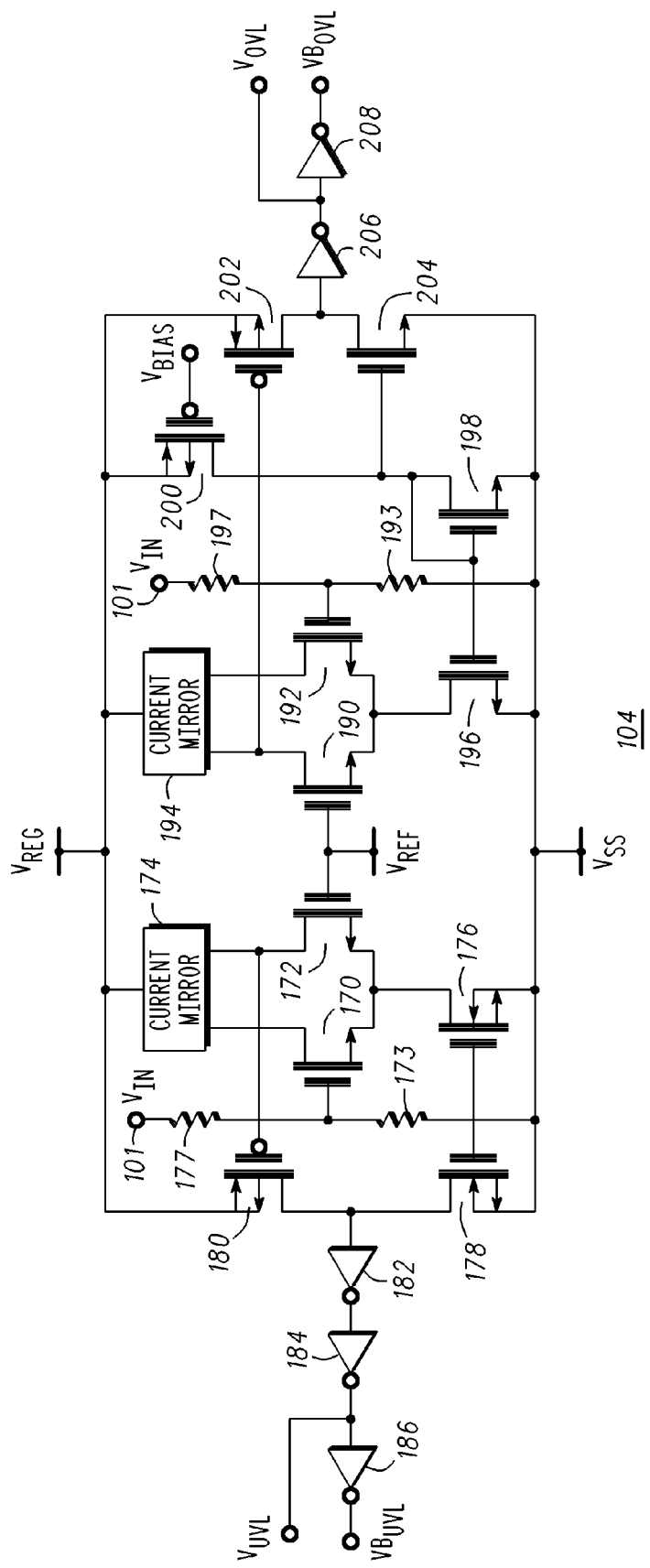
FIG. 5 is a circuit schematic of an under-voltage and an over-voltage lockout circuit of the over-voltage protection circuit of FIG. 4.

FIG. 5 is a circuit schematic of a lockout circuit 104 comprising a pair of transistors 170 and 172 coupled as a differential pair. Thus, the source electrodes of transistors 170 and 172 are connected together and the gate electrodes serve as the inputs of the differential pair. The drain electrodes are connected to a current mirror 174. A drain of a transistor 176 is connected to the sources of transistors 170 and 172, the source of transistor 176 is coupled for receiving a source of operating potential such as, for example, $V_{SS}$, and the gate of transistor 176 is connected to the gate of an n-channel field effect transistor 178. The source electrode of transistor 178 is coupled for receiving source of operating potential $V_{SS}$. The drain electrode of transistor 178 is connected to the drain electrode of a p-channel field effect transistor 180, the source electrode of transistor 180 is coupled for receiving a source of operating potential $V_{REG}$, and the gate electrode of transistor 180 is connected to the drain electrode of transistor 172. The drain electrodes of transistors 178 and 180 are connected to a string of three series-connected inverters 182, 184, and 186. P-channel field effect transistor 180 serves as a level shift circuit. The output signal from inverter 184 is an under-voltage lockout signal, $V_{UVL}$, and the output signal from inverter 186 is a complementary under-voltage lockout signal $VB_{UVL}$.

Lockout circuit 104 further comprises a pair of transistors 190 and 192 coupled as a differential pair, wherein the source electrodes of transistors 190 and 192 are connected together and the gate electrodes serve as inputs for the differential pair. The gate electrode of transistor 170 is coupled for receiving source of operating potential $V_{SS}$ through a resistor 173 and for receiving input voltage $V_{IN}$ at input node 101 through a resistor 177, and the gate electrode of transistor 192 is coupled for receiving source of operating potential $V_{SS}$ through a resistor 193 and for receiving input voltage $V_{IN}$ at input node 101 through a resistor 197. Preferably, the gate electrodes of transistors 172 and 190 are commonly connected to each other and for receiving a reference voltage $V_{REF}$. Thus, differential pair 170 and 172 and differential pair 190 and 192 compare a portion of input voltage $V_{IN}$ with reference voltage $V_{REF}$ for generating the under-voltage and over-voltage lockout threshold voltages, $V_{UVL}$ and $V_{OVL}$, respectively. The drain electrodes of transistors 190 and 192 are connected to a current mirror 194. A drain electrode of a transistor 196 is connected to the source electrodes of transistors 190 and 192, the source electrode of transistor 196 is coupled for receiving source of operating potential $V_{SS}$, and the gate electrode of transistor 196 is connected to the gate and drain electrodes of an n-channel transistor 198. The drain electrode of transistor 198 is connected to the drain electrode of a p-channel transistor 200 and the source electrode of transistor 198 is coupled for receiving source of operating potential $V_{SS}$. The source and gate electrodes of transistor 200 are coupled for receiving voltage $V_{REG}$ and bias voltage $V_{BIAS}$, respectively. The drain electrode of transistor 190 is connected to the gate electrode of a p-channel transistor 202 and the drain electrode of transistor 198 is connected to the gate electrode of an n-channel transistor 204. The drain electrodes of transistors 202 and 204 are connected together, the source electrode of transistor 204 is connected to source of operating potential $V_{SS}$, and the source electrode of transistor 202 is coupled for receiving voltage $V_{REG}$. The drain electrodes of transistor 202 and 204 are connected to a string of two inverters 206 and 208. P-channel field effect transistor 202 serves as a level shift circuit. The output signal from inverter 206 is an over-voltage lockout signal, $V_{OVL}$, and the output signal from inverter 208 is a complementary over-voltage lockout signal, $VB_{OVL}$.

Figure 6:
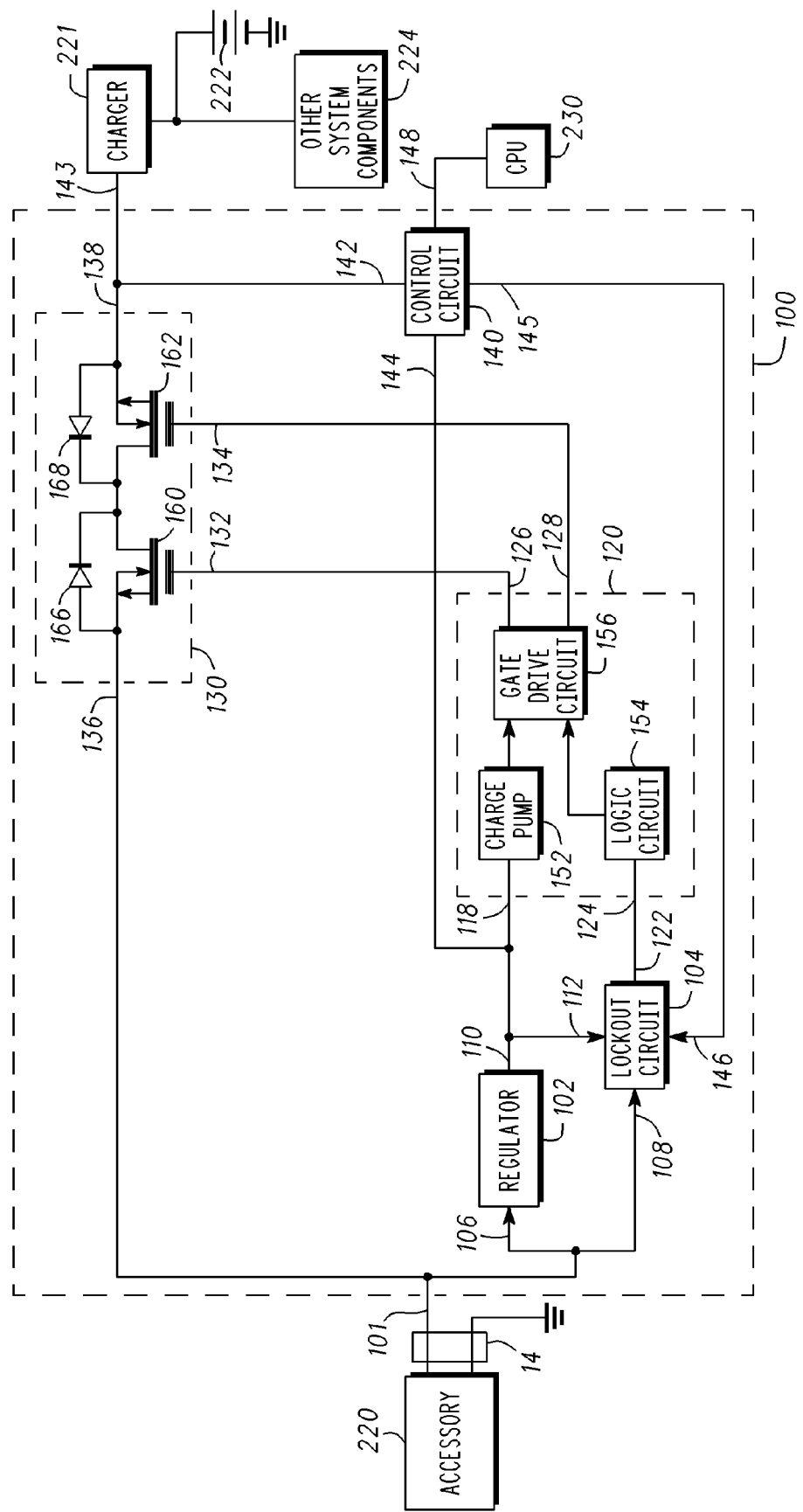
FIG. 6 is a block diagram of the over-voltage protection circuit of FIG. 4 coupled for driving an accessory in accordance with an embodiment of the present invention.

FIG. 6 is a block diagram of over-voltage protection circuit 100 coupled for driving an accessory 220 in accordance with an embodiment of the present invention. Accessory 220 may be connected to the commonly connected terminals 106 and 108 and conductor 136 at input node 101, and a charger 221 is connected to commonly connected conductor 138 and input 142 of control circuit 140 at output node 143. A battery 222 and other system components 224 may be connected to charger 221. A circuit such as, for example, a CPU 230 is connected to input 148 of control circuit 140 and may be configured to disable control circuit 140 and to control lockout circuit 104.

In operation, when an AC adapter (not shown) is connected to the commonly connected terminals 106 and 108 and conductor 136 at input node 101 instead of an accessory, the AC adapter provides an electrical signal to voltage regulator 102 and lockout circuit 104. In the event that the voltage appearing on the commonly connected terminals 106 and 108 and conductor 136 is greater than over-voltage lockout threshold voltage $V_{OVL}$, voltage regulator 102, lockout circuit 104, and control circuit 120 generate drive signals that render switching circuit 130 non-conductive in either the forward direction, i.e., from input 101 to output 143, or the reverse direction, i.e., from output 143 to input 101. More particularly, logic circuit 154 receives a signal from lockout circuit 104 that indicates the value of input voltage $V_{IN}$. If input voltage $V_{IN}$ is within the under-voltage/over-voltage threshold window, the signal at input 124 activates gate drive circuit 156 to be sensitive to the output signal of charge pump 152. In this case, the signals at outputs 126 and 128 of gate drive circuit 156 follow the output value of charge pump 152 and drive the gates of switches 160 and 162 so that they are conducting. Thus, the switches are open. When input voltage $V_{IN}$ is lower than the under-voltage lockout threshold window or higher than the over-voltage lockout threshold, i.e., outside the under-voltage/over-voltage threshold window, the signal at input 124 drives logic circuit 154 to provide a signal to gate drive circuit 156 that causes it to pull down the voltages at the gates of switches 160 and 162, thereby turning off or opening up switches 160 and 162 and stopping current flow through switches 160 and 162.

When an accessory such as, for example, a headset or a memory card is connected to the commonly connected terminals 106 and 108 and conductor 136, CPU 230 enables control circuit 140 which control circuit 140 disables lockout circuit 104 and provides a subsidiary supply path to control circuit 120. In response to the control signal from CPU 230, control circuit 140 creates a current path from output 143 to the input of control circuit 120, i.e., control circuit 140 provides a path for supplying the core of the circuit from battery 222 through the output.

By now it should be appreciated that a circuit and a method for blocking current flow in a bi-directional over-voltage protection circuit have been provided. An advantage of the bi-directional over-voltage protection circuit is that it allows a greater input voltage swing than previous circuits. The bi-directional over-voltage protection circuit allows current flow when the input voltage is low and it is desirable to transition from a disable state to an enable state. In accordance with an embodiment of the present invention, two n-channel MOSFETS are configured so their bulk or body diodes are in a back-to-back or front-to-front configuration to stop substantially completely the current flow. In addition, control circuit 140 supplies the gate drive circuit for the n-channel MOSFETS from the output node and opens current flow from the output node to the input node.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A bi-directional over-voltage protection circuit, comprising:
    a regulator having an input and an output;
    a lockout circuit having first and second inputs and an output, the first input of the lockout circuit coupled to the input of the regulator and coupled for receiving an input signal;
    a first control circuit having first and second inputs and first and second outputs, the first input coupled to the output of the regulator and the second input coupled to the output of the lockout circuit;
    a second control circuit having first and second inputs and an output, the first input coupled for receiving a control signal and the output coupled to the first input of the first control circuit;
    a first transistor having a control electrode and first and second current carrying electrodes, the first current carrying electrode coupled for receiving the input signal and the control electrode coupled to the first output of the first control circuit; and
    a second transistor having a control electrode and first and second current carrying electrodes, the control electrode coupled to the second output of the first control circuit, the first current carrying electrode of the second transistor coupled to the second current carrying electrode of the first transistor, the second current carrying electrode of the second transistor coupled to the second input of the second control circuit.

2. The bi-directional over-voltage protection circuit of claim 1, wherein the first control circuit comprises:
    a charge pump having an input and an output;
    a logic circuit having an input and an output, the input coupled to the output of the lockout circuit; and
    a gate drive circuit having first and second inputs and first and second outputs, the first input coupled to the output of the charge pump, the second input coupled to the output of the logic circuit, the first output coupled the control electrode of the first transistor, and the second output coupled to the control electrode of the second transistor.

3. The bi-directional over-voltage protection circuit of claim 2, wherein the lockout circuit comprises:
a first differential pair having first and second current carrying electrodes and first and second control electrodes;
a first current mirror coupled to the first and second current carrying electrodes of the first differential pair;
a first level shift circuit having a control electrode and a current carrying electrode, the control electrode coupled to the second current carrying electrode of the first differential pair; and
a first plurality of series-connected inverters coupled to the first current carrying electrode of the first level shift circuit.

4. The bi-directional over-voltage protection circuit of claim 3, wherein the lockout circuit further comprises:
a second differential pair having first and second current carrying electrodes and first and second control electrodes;
a second current mirror coupled to the first and second current carrying electrodes of the second differential pair;
a second level shift circuit having a control electrode and a current carrying electrode, the control electrode coupled to the second current carrying electrode of the second differential pair; and
a second plurality of series-connected inverters coupled to the first current carrying electrode of the second level shift circuit.

5. The bi-directional over-voltage protection circuit of claim 4, wherein the first plurality of series-connected inverters comprises three series-connected inverters and the second plurality of series-connected inverters comprises two series-connected inverters.

6. The bi-directional over-voltage protection circuit of claim 2, wherein the output of the regulator is coupled to the second input of the lockout circuit.

7. The bi-directional over-voltage protection circuit of claim 2, wherein the first and second transistors are N-channel field effect transistors.

8. The bi-directional over-voltage protection circuit of claim 1, further including a charger coupled to the second current carrying electrode of the second transistor.

9. The bi-directional over-voltage protection circuit of claim 1, wherein the output of the regulator is coupled to the second input of the lockout circuit.

10. A bi-directional over-voltage protection circuit, comprising:
a forward multi-transistor switching control circuit capable of regulating an input voltage, the forward multi-transistor switching control circuit having first and second inputs and first and second outputs, the first input coupled for receiving the input voltage;
a reverse multi-transistor switching control circuit having first and second inputs and an output, the output coupled to the forward multi-transistor switching control circuit; and
a multi-transistor switching circuit having first and second inputs and first and second current carrying electrodes, the first and second inputs coupled to the first and second outputs of the forward multi-transistor switching control circuit, respectively, and the first current carrying electrode coupled for receiving the input voltage.

11. The bi-directional over-voltage protection circuit of claim 10, wherein the multi-transistor switching circuit comprises:
a first transistor having a control electrode and first and second current carrying electrodes, the control electrode coupled to the first output of the forward multi-transistor switching control circuit, the first current carrying electrode of the first transistor serving as the first current carrying electrode of the multi-transistor switching circuit; and
a second transistor having a control electrode and first and second current carrying electrodes, the control electrode of the second transistor coupled to the second output of the forward multi-transistor switching control circuit, the first current carrying electrode of the second transistor coupled to the second current carrying electrode of the first transistor, and the second current carrying electrode of the second transistor coupled to the first input of the reverse multi-transistor switching control circuit.

12. The bi-directional over-voltage protection circuit of claim 11, wherein the forward multi-transistor switching control circuit comprises:
a regulator having an input coupled for receiving the input voltage; and
a gate drive circuit coupled to the regulator, the gate drive circuit having first and second outputs, the first and second outputs of the gate drive circuit serving as the first and second outputs of the forward multi-transistor switching control circuit.

13. The bi-directional over-voltage protection circuit of claim 12, wherein the forward multi-transistor switching control circuit further comprises a lockout circuit having first and second inputs and an output, the first input coupled for receiving the input voltage and the output coupled to the gate drive circuit.

14. The bi-directional over-voltage protection circuit of claim 13, wherein the output of the reverse multi-transistor switching control circuit is coupled to the second input of the lockout circuit.

15. The bi-directional over-voltage protection circuit of claim 13, wherein the lockout circuit comprises:
a first differential pair having first and second current carrying electrodes and first and second control electrodes;
a first current mirror coupled to the first and second current carrying electrodes of the first differential pair;
a first level shift circuit having a control electrode and a current carrying electrode, the control electrode coupled to the second current carrying electrode of the first differential pair;
a first plurality of series-connected inverters coupled to the first current carrying electrode of the first level shift circuit;
a second differential pair having first and second current carrying electrodes and first and second control electrodes;
a second current mirror coupled to the first and second current carrying electrodes of the second differential pair;
a second level shift circuit having a control electrode and a current carrying electrode, the control electrode coupled to the second current carrying electrode of the second differential pair; and
a second plurality of series-connected inverters coupled to the first current carrying electrode of the second level shift circuit.

16. The bi-directional over-voltage protection circuit of claim 10, further including:

a charger coupled to the second output of the forward multi-transistor switching control circuit; and an accessory circuit coupled to the first current carrying electrode of the forward multi-transistor switching control circuit.

17. The bi-directional over-voltage protection circuit of claim 10, further including a battery coupled to the charger.

18. A method for blocking current flow in an over-voltage protection circuit, comprising:

providing an input signal at a first node;

generating a first current that flows through the first node in response to the input signal, wherein the first current flows from the first node to a second node in response to a first control signal;

blocking the first current from flowing to the second node in response to a second control signal; and generating a second current that flows through the second node in response to the second control signal, wherein the second current flows from the second node to the first node.

19. The method of claim 18, wherein generating the first current includes generating the first current to flow along a first current path; and generating the second current includes generating the second current to flow along a second current path.

20. The method of claim 19, further including using the first current to charge a power source coupled to the over-voltage protection circuit and using the second current to drive an accessory coupled to the over-voltage protection circuit.

* * * * *